United States Patent
Bowman et al.

(10) Patent No.: US 9,958,108 B2
(45) Date of Patent: May 1, 2018

(54) ELECTRIC SIT-STAND WORKSTATION WITH DISPLAY SUPPORT APPARATUS

(71) Applicant: Innovative Office Products, LLC, Easton, PA (US)

(72) Inventors: Stephen J. Bowman, Saylorsburg, PA (US); Michael P. Smith, Allentown, PA (US); Peter J. Carrasquillo, Columbia, MO (US); Joseph J. Tosolt, Danielsville, PA (US)

(73) Assignee: Innovative Office Products, LLC, Easton, PA (US)

( * ) Notice: Subject to any disclaimer, the term of this patent is extended or adjusted under 35 U.S.C. 154(b) by 0 days. days.

(21) Appl. No.: 15/408,904

(22) Filed: Jan. 18, 2017

(65) Prior Publication Data

US 2017/0202351 A1 Jul. 20, 2017

Related U.S. Application Data

(60) Provisional application No. 62/280,932, filed on Jan. 20, 2016.

(51) Int. Cl.
| | |
|---|---|
| *F16M 11/18* | (2006.01) |
| *F16M 11/10* | (2006.01) |
| *F16M 11/20* | (2006.01) |
| *F16M 11/24* | (2006.01) |

(52) U.S. Cl.
CPC ............. *F16M 11/18* (2013.01); *F16M 11/10* (2013.01); *F16M 11/2014* (2013.01); *F16M 11/2085* (2013.01); *F16M 11/24* (2013.01)

(58) Field of Classification Search
CPC ........ A47B 21/02; A47B 21/04; F16M 11/04; F16M 11/18
See application file for complete search history.

(56) References Cited

U.S. PATENT DOCUMENTS

| | | | |
|---|---|---|---|
| 7,028,961 B1 * | 4/2006 | Dittmer ................. | F16M 11/04 248/278.1 |
| 7,380,760 B2 * | 6/2008 | Dittmer ................ | F16M 11/041 248/278.1 |
| 8,342,465 B2 | 1/2013 | Koder | |
| 9,470,357 B2 * | 10/2016 | Hazzard ................ | A47B 21/02 |

(Continued)

OTHER PUBLICATIONS

Balt 90531 Up-rite Desk Mounted Sit and Stand Workstation: retrieved from http://www.worthingtondirect.com/computer-furniture/90531-up-rite-desk-mounted-sit-and-stand-workstation.htm?utm_source=pricegrabber&utm_medium=productfeed&utm_campaign=product on Dec. 29, 2016.

(Continued)

*Primary Examiner* — Daniel J Rohrhoff
(74) *Attorney, Agent, or Firm* — Design IP

(57) ABSTRACT

In one respect, the invention of the present application is an electric sit-stand workstation comprising a stationary column and a height adjustment assembly including an attached worksurface and at least one display support assembly adapted to support at least one electronic display therefrom, wherein the height of the height adjustment assembly with respect to the stationary column is electrically adjustable. Alternate embodiments of sit-stand workstations and methods of using said workstations are also disclosed.

20 Claims, 14 Drawing Sheets

(56) References Cited

U.S. PATENT DOCUMENTS

| | | | | |
|---|---|---|---|---|
| 2005/0258319 A1* | 11/2005 | Jeong | ............... | F16M 11/105 248/176.1 |
| 2007/0205340 A1 | 9/2007 | Jung | | |
| 2007/0252919 A1 | 11/2007 | McGreevy | | |
| 2008/0117578 A1* | 5/2008 | Moscovitch | ......... | F16M 11/105 361/679.04 |
| 2009/0134285 A1* | 5/2009 | Huang | ............... | F16M 11/08 248/124.1 |
| 2009/0173847 A1 | 7/2009 | Dittmer et al. | | |
| 2010/0128423 A1* | 5/2010 | Moscovitch | ......... | F16M 11/041 361/679.01 |
| 2014/0117182 A1* | 5/2014 | Blackburn | ............. | F16M 11/18 248/298.1 |
| 2015/0131217 A1* | 5/2015 | Brandt | ............... | F16M 11/2014 361/679.04 |
| 2015/0251047 A1* | 9/2015 | Maaniitty | ............... | A47B 21/02 482/54 |
| 2016/0051042 A1* | 2/2016 | Koch | ..................... | A47B 9/00 248/550 |
| 2016/0120303 A1* | 5/2016 | Constantino | ........... | F16M 11/42 108/28 |
| 2017/0135587 A1* | 5/2017 | Desroches | ........... | A61B 5/6892 |
| 2017/0196352 A1* | 7/2017 | King | ..................... | A47B 21/02 |

OTHER PUBLICATIONS

Ergotech One Touch Ultra Sit-Stand Workstation: retrieved from http://ergotechgroup.com/ergo_pdf/One-Touch.pdf on Dec. 29, 2016.

Erogtron Workfit-S, Dual Monitor Sit-Stand Workstation: retrieved from http://www.ergotron.com/en-us/products/product-details/33-341#/ on Dec. 29, 2016.

HealthPostures 6300 TaskMate Go Standing Desk: retrieved from https://healthpostures.com/products/taskmate-go-6300/ on Dec. 29, 2016.

Humanscale Quickstand: retrieved from http://www.humanscale.com/products/product.cfm?group=quickstand on Dec. 29, 2016.

Innovative Office Products Winston Workstation: retrieved from http://www.lcdarms.com/products/winston/ on Dec. 29, 2016.

Innovative Office Products Bild: retrieved from http://www.lcdarms.com/products/bild/ on Dec. 29, 2016.

* cited by examiner

ELECTRIC SIT-STAND WORKSTATION WITH DISPLAY SUPPORT APPARATUS

FIELD OF THE INVENTION

The present invention relates to height-adjustable workstations, more particularly to electric height-adjustable workstations capable of supporting one or more displays such that that height of the one or more displays and the height between the worksurface and the one or more displays can be easily adjusted for either seated or standing use by more than one individual.

BACKGROUND

The use of height-adjustable apparatuses that permit users to change the elevation of their one or more display devices are becoming increasingly popular. Many of these devices lack the ability to adjust the height of the entire workstation area along with the display(s), such that a user's keyboard and other peripherals are not useable when the display(s) are in a raised position. Further, many existing sit-stand devices allow only for adjustment of the entire desk surface, which is typically heavy and therefore requires more than one and/or very large lifting mechanism(s) to be provided. Many existing multi-display devices are not expandable or reconfigurable in order to support a different number of displays or to support the displays in an array of different configurations. Additionally, many existing devices are not height-adjustable such that the displays can be quickly and easily moved between heights in which the displays can be viewed. Further, many existing devices require manual adjustment of the height of the work surface, or are configurable for use by only one individual at a time.

There is a need for an improved sit-stand workstation that is versatile and configurable according to the wants and needs of individual users.

SUMMARY OF THE INVENTION

In one respect, the present invention is a support apparatus that is supported by and extends from a support surface, the support apparatus comprising: a base plate that is adapted to rest on the support surface; a column that is fixed to the base plate and that extends upwardly from the base plate and support surface, the column having a height; and a height adjustment assembly that is height-adjustable along at least a portion of the height of the column with respect to the support surface, the height adjustment assembly comprising a monitor position column having a height, a first support beam assembly attached to the monitor position column via a first hinge, the first support beam assembly comprising a first beam member and at least one display support assembly that is attached to the first beam member, the at least one display support assembly being adapted to support a first electronic display therefrom, the first hinge being rotatable about a first generally vertical axis such that a rotational position of the first beam member is adjustable with respect to the monitor position column, the at least one display support assembly being rotatable about a second generally vertical axis with respect to the first beam member; and a worksurface attached to the monitor position column, the worksurface having a top surface that extends outwardly in a generally horizontal plane from the monitor position column.

In another respect, the present invention is a support apparatus that is supported by and extends from a support surface, the support apparatus comprising: a base plate that is adapted to rest on the support surface; a column that is fixed to the base plate and that extends upwardly from the base plate and support surface, the column having a height and at least one slot oriented along at least a portion of the height of the column, the column further comprising a carriage at least partially located therein; a motor that is operably connected to the carriage; at least one input device that is operably connected to the motor, the at least one input device being adapted to permit a user to operate the motor such that a position of the carriage along the at least a portion of the height of the column is adjustable; and a height adjustment assembly that is attached to the carriage through the at least one slot, such that adjustment of the position of the carriage along the at least a portion of the height of the column adjusts the position of the height adjustment assembly with respect to the support surface accordingly, the height adjustment assembly comprising a first support beam assembly including a first beam member and at least one display support assembly that is attached to the first beam member, the at least one display support assembly being adapted to support a first electronic display therefrom.

In yet another respect, the present invention is a method of configuring a support apparatus for supporting at least one electronic display, the method comprising placing a base plate of the support apparatus on a support surface such that a column that is fixed to the base plate extends upwardly from the base plate and support surface, the column having a height, the support apparatus further comprising a height adjustment assembly that is height-adjustable along at least a portion of the height of the column with respect to the support surface, the height adjustment assembly comprising a monitor position column having a height, a first support beam assembly attached to the monitor position column via a first hinge, the first support beam assembly comprising a first beam member and at least one display support assembly that is attached to the first beam member, the first hinge being rotatable about a first generally vertical axis such that a rotational position of the first beam member is adjustable with respect to the monitor position column, the at least one display support assembly being rotatable about a second generally vertical axis with respect to the first beam member; and a worksurface attached to the monitor position column, the worksurface having a top surface that extends outwardly in a generally horizontal plane from the monitor position column; attaching the at least one electronic display to the at least one display support assembly; and rotating the first beam member about the first generally vertical axis and rotating the at least one display support assembling about the second generally vertical axis until the at least one electronic display is in a desired spatial and angular position for a user of the support apparatus.

BRIEF DESCRIPTION OF THE DRAWINGS

The electric sit-stand workstation according to the present invention is further described with reference to the accompanying drawings, in which.

DETAILED DESCRIPTION OF THE PREFERRED EMBODIMENTS

Figure 1:
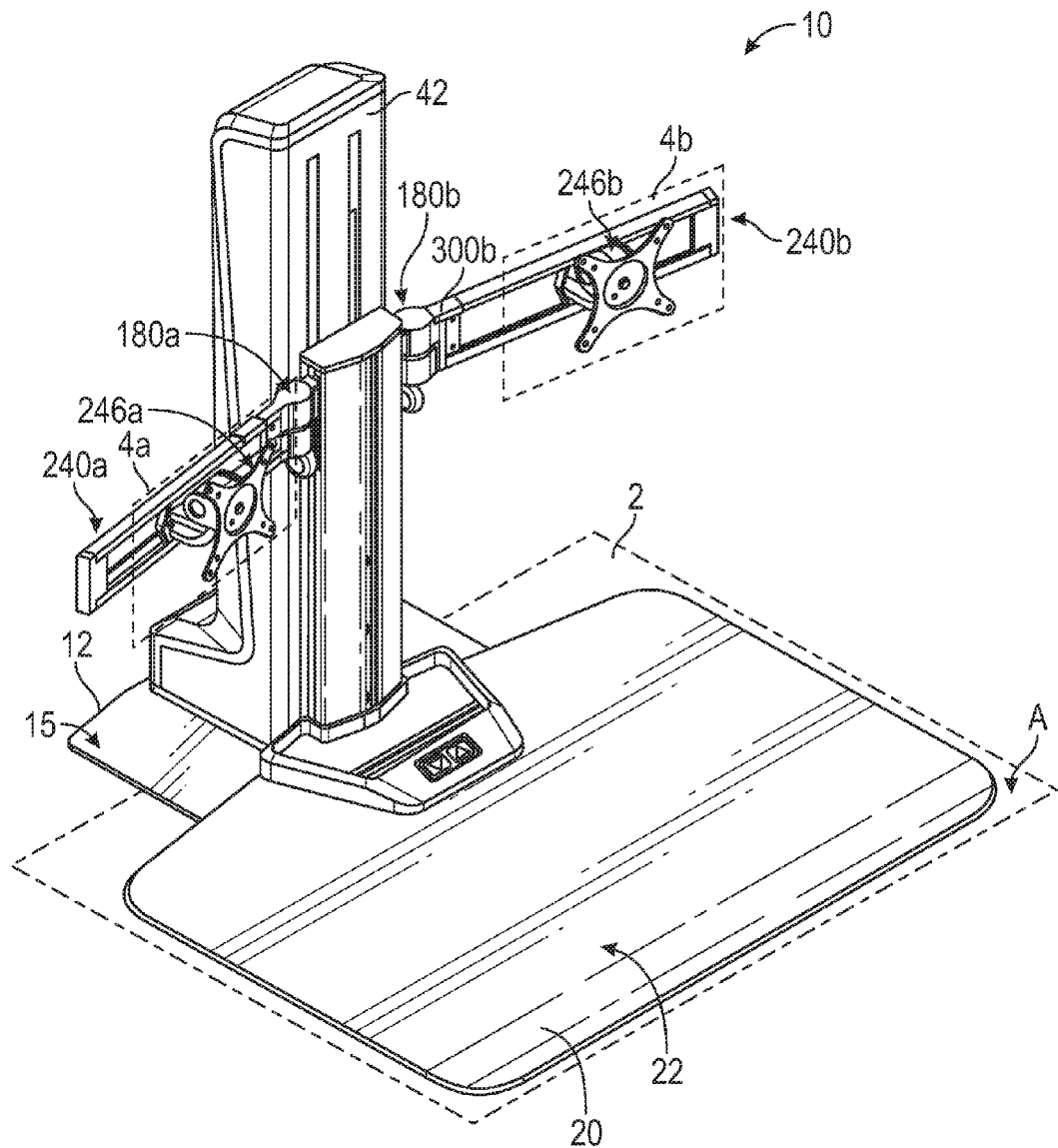
FIG. 1 is a perspective front view of an embodiment of a sit-stand workstation according to the present invention, with a height adjustment assembly thereof in a fully-lowered position.

The ensuing detailed description provides preferred exemplary embodiments only, and is not intended to limit the scope, applicability, or configuration of the herein disclosed inventions. Rather, the ensuing detailed description of the preferred exemplary embodiments will provide those skilled in the art with an enabling description for implementing the preferred exemplary embodiments in accordance with the herein disclosed invention. It is understood that various changes may be made in the function and arrangement of elements without departing from the spirit and scope of the invention, as set forth in the appended claims.

To aid in describing the invention, directional terms may be used in the specification and claims to describe portions of the present invention (e.g., upper, lower, left, right, etc.). These directional definitions are merely intended to assist in describing and claiming the invention and are not intended to limit the invention in any way. In addition, reference numerals that are introduced in the specification in association with a drawing figure may be repeated in one or more subsequent figures without additional description in the specification, in order to provide context for other features.

The present application incorporates by reference the entire contents of U.S. Provisional Application No. 61/912,418, filed Dec. 5, 2013, U.S. Provisional Application No. 62/009,325, filed Jun. 8, 2014, and U.S. patent application Ser. No. 14/561,910, filed Dec. 5, 2014, as if the contents thereof were set forth herein in their entireties.

For purposes of the specification and appended claims, the term "electrically connected" has the meaning of being wired to or in wired or wireless connection with such that power and/or electrical signals may be directly or indirectly transferred between two parts in one or both directions.

For purposes of the specification and appended claims, the terms "generally horizontal" or "generally vertical" with respect to an axis or plane have the meanings of being within positive or negative 10 degrees of true horizontal or vertical, respectively.

For purposes of the specification and appended claims, the term "approximately" with respect to an angle has the meaning of being within positive or negative 5 degrees of that angle.

Sit-stand desks are increasingly common in the workplace to help users combat the recognized negative health effects of sitting for long periods of time. Many existing sit-stand devices allow only for adjustment of the entire desk surface, which is typically heavy and therefore requires more than one and/or heavy-duty lifting mechanism(s) to be used. This drives up the costs of these devices and makes them slower and less energy-efficient to operate. Further, it is now common for computer users to simultaneously use multiple displays at their workstations. Moreover, it is common for multiple users to use a single workstation, which often results in the workstation setup being less than ideal for each user or all users, or the users having to undergo the time-consuming process of reconfiguring the workstation. Because different users have different wants and needs with respect to their display configuration, it is desirable to have an expandable, modular sit-stand workstation that is highly configurable according to the specific needs and desires of a particular user.

One example of a manually-adjustable sit-stand workstation is disclosed in U.S. patent application Ser. No. 14/561,910, filed Dec. 5, 2014, which published on Jun. 11, 2015 as U.S. Patent Application Publication No. US2015/0159804A1. The '910 Application is commonly owned with the present application, and the entire contents thereof are incorporated herein by reference. The sit-stand workstation disclosed in the '910 Application is manually height-adjustable using a cable-attached release mechanism that temporarily frees movement of a gas cylinder that is used to reposition and support the height adjustment assembly of the sit-stand workstation.

Referring now generally to FIGS. 1-14, an embodiment of an electric sit-stand workstation 10 according to the present invention will be described in detail. In this embodiment, the workstation 10 is configured to support two displays 4a,4b, as will be described in further detail below. It should be understood that any number of displays could be attached to the workstation 10 in a multitude of various configurations, while remaining within the scope of the present invention. As would be appreciated by a person having ordinary skill in the relevant art, U.S. Provisional Application Nos. 61/912,418 and 62/009,325 and U.S. patent application Ser. No. 14/561,910—all of which are incorporated herein by reference—teach expandable multi-display support apparatuses having many component parts that are interchangeable with the workstation 10 according to the present invention, and teach various display configurations that could be used with the workstation 10 taught herein.

Referring back to FIGS. 1-14, in this embodiment the workstation 10 comprises a base plate 12 for supporting the workstation 10 atop an existing support surface 2, which may be, for example, a desktop or tabletop surface. The support surface 2 (see FIG. 1) is assumed to be planar and lies in a plane "A." The base plate 12 has a bottom surface 13 that is planar and that lies in a plane "B" (not labeled) and a top surface 15 that is planar and that lies in a plane "C." In this embodiment, four pads 14a-14d are attached to the bottom surface 13, protect the support surface 2 from damage, and allow the user to quickly and easily slide the workstation 10 around on top of the support surface 2. While in this embodiment the base plate 12 permits the workstation 10 to be freestanding, the workstation 10 could alternatively be fixedly attached to the support surface 2 via a clamp mount or through mount. In alternate embodiments, the base plate 12 could be constructed with one or more handles, cutouts, or finger notches that permit a user to more easily grab the base plate 12 so that the workstation 10 can more easily be moved about the support surface 2.

Figure 3:
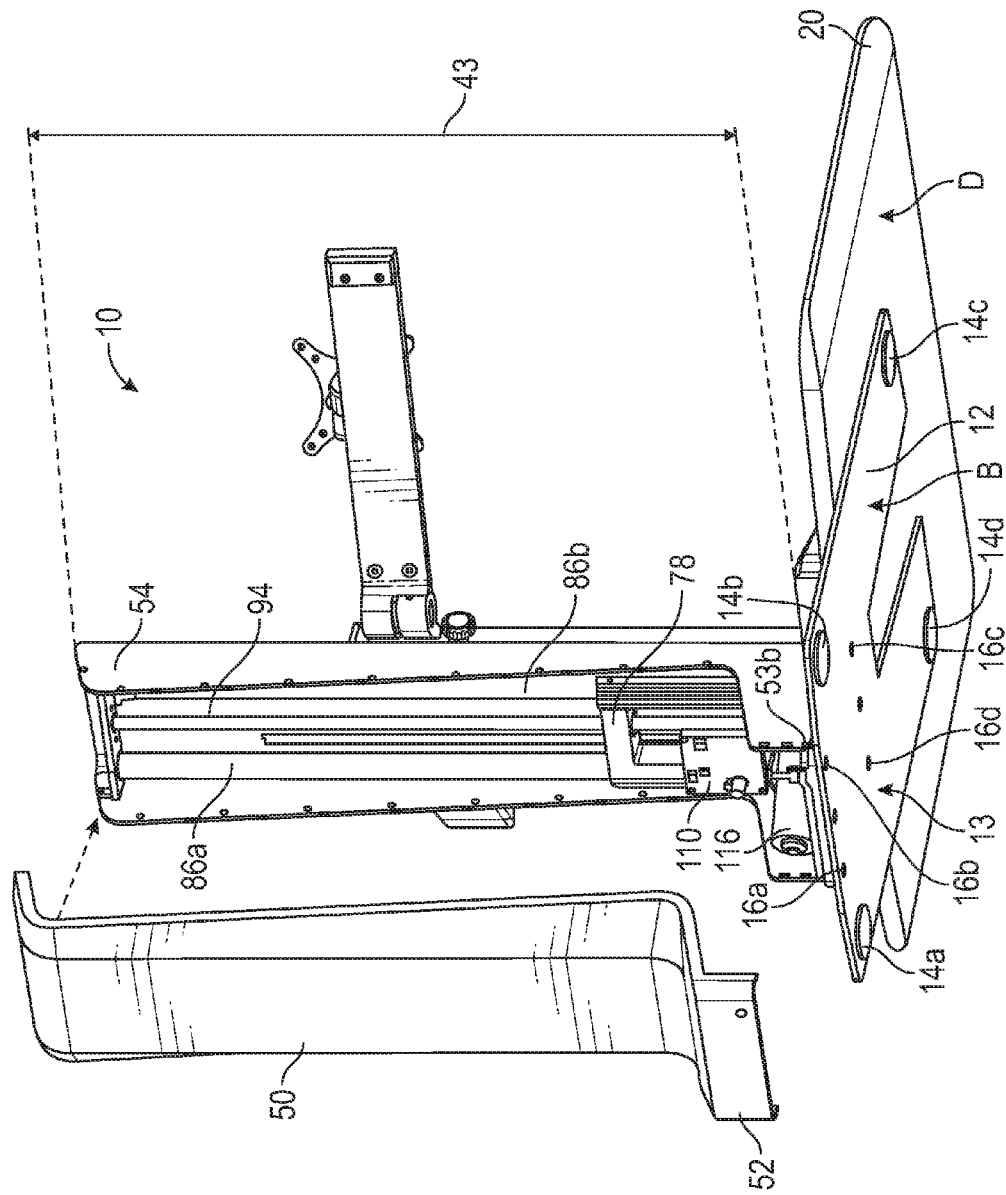
FIG. 3 is a perspective rear view of the sit-stand workstation of FIG. 1, with the column back shroud removed to show the interior parts and construction of the column.

As shown in FIG. 3, fasteners 16a-16d connect through the bottom surface 13 of the base plate 12 and are used to attach a column 42 to the base plate 12. The column 42 comprises a height 43, a column base plate 44 that is attached to the base plate 12 via the fasteners 16a-16d, a column front shroud 54, and a column back shroud 50. The column front shroud 54 and column back shroud 50 are attached together and to the column base plate 44. The base plate 12 rests atop the support surface 2, and the column 42 and base plate 12 remain in a fixed height position with respect to the support surface 2 through all possible configurations of the workstation 10. As will be described in further detail below, a height adjustment assembly 40 is height-adjustable with respect to the column 42 and support surface 2 so that the attached displays 4a,4b and worksurface 20 can be moved between seated and standing positions for a particular user. In this embodiment, the column 42 extends at an orthogonal angle with respect to the base plate 12. In alternate embodiments, the column 42 could extend generally vertically, or at greater angles, from the base plate 12.

Figure 2:
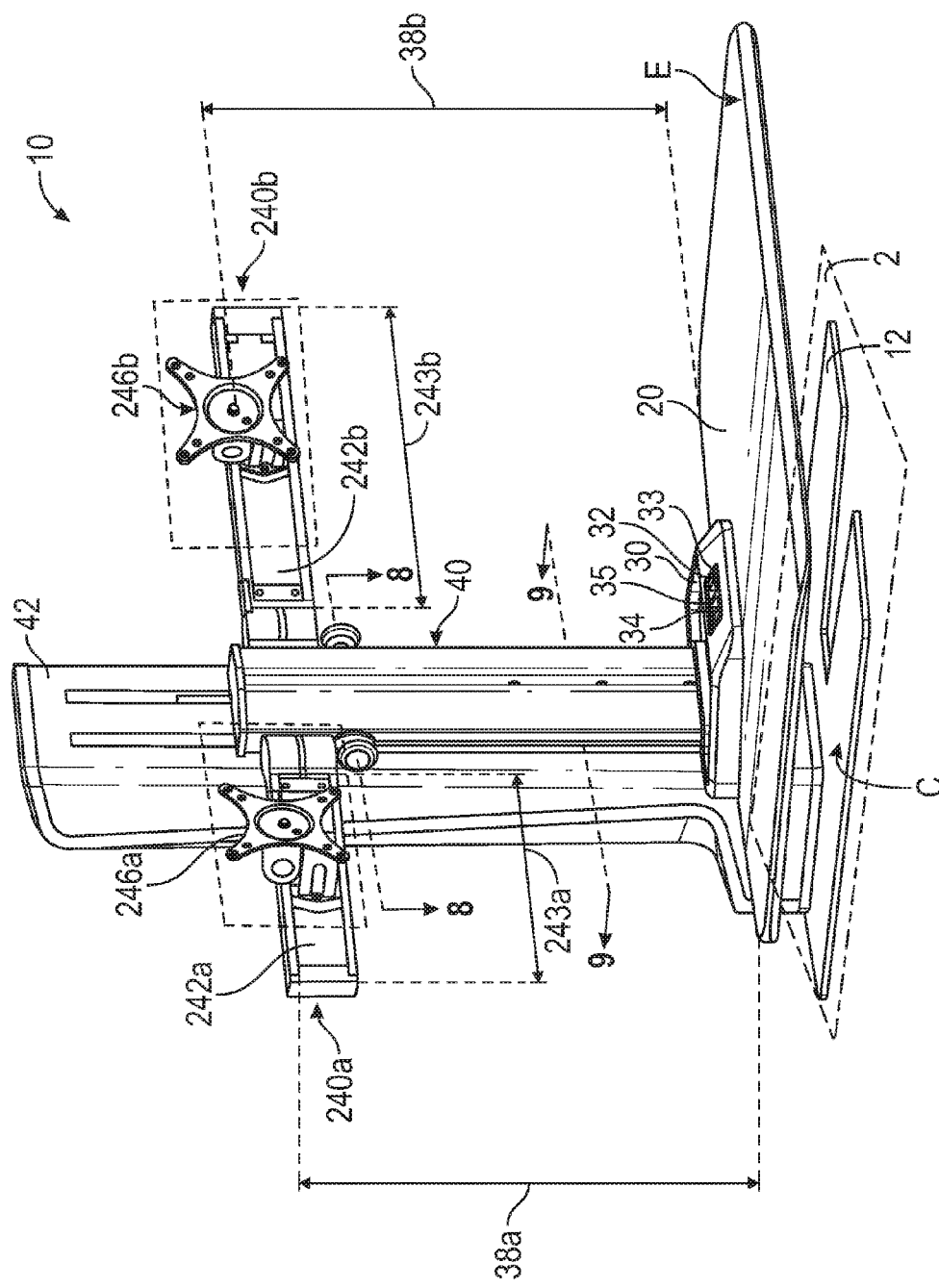
FIG. 2 is a perspective front view thereof, with the height adjustment assembly thereof in a partially raised position.

Turning back to the embodiment of FIGS. 1-14, the height adjustment assembly 40 is attached to a carriage 78 that is located primarily within the column 42, and adjustment of the carriage 78 upwardly and downwardly within the column 42 adjusts the height of the height adjustment assembly 40, since it is attached to the carriage 78. The worksurface 20 comprises a bottom surface 24 that lies in a plane "D" and a top surface 22 that lies generally in a plane "E." In the lowermost position of the height adjustment assembly 40 (as shown in FIG. 1), the bottom surface 24 of the worksurface 20 contacts the top surface 15 of the base plate 12. When the position of the height adjustment assembly 40 has been adjusted upwardly (e.g., as shown in FIG. 2), the bottom surface 24 of the worksurface 20 is no longer in contact with the top surface 15 of the base plate 12.

Figure 7:
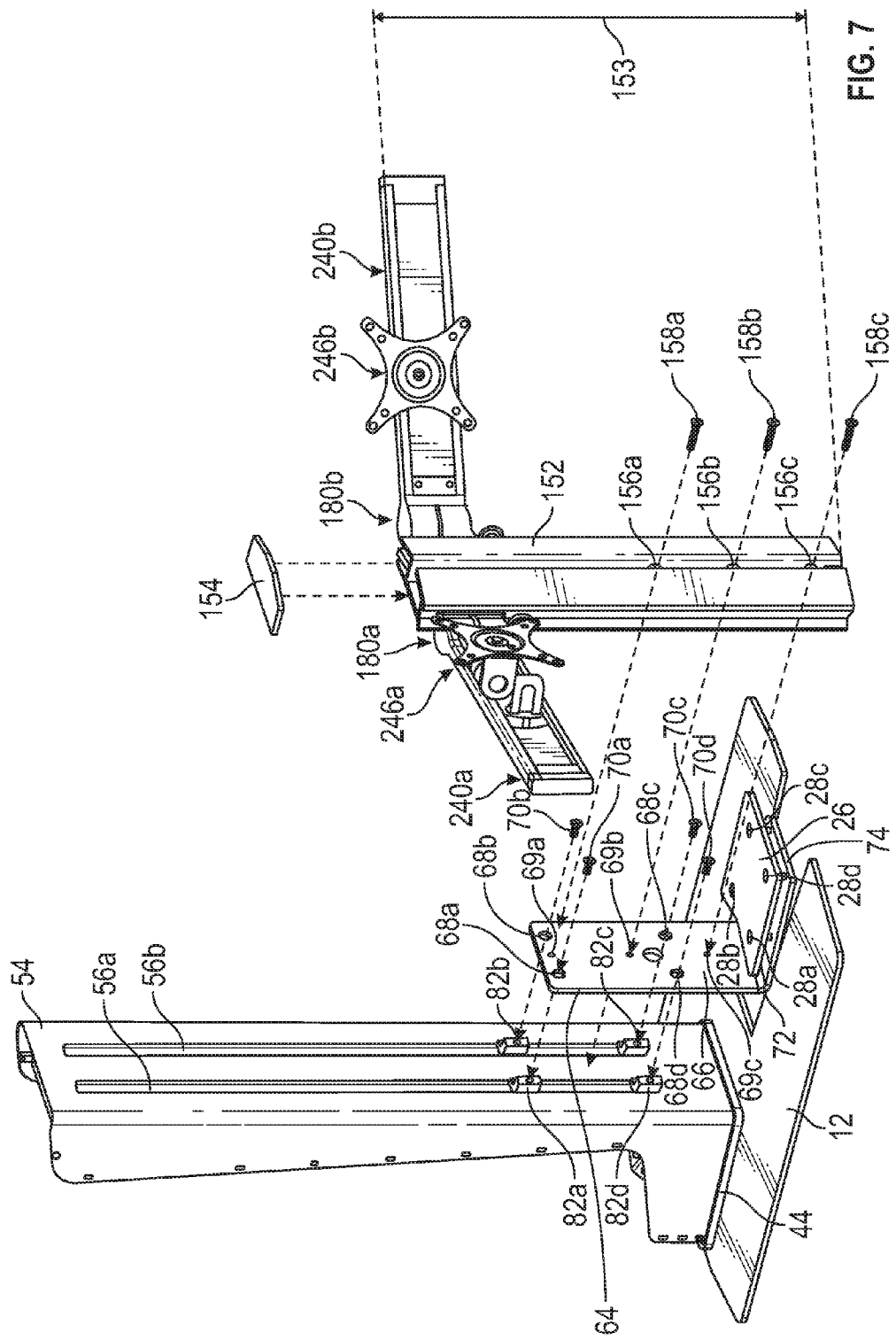
FIG. 7 is a partial exploded view of the column and monitor position column of the sit-stand workstation of FIG. 1.

As shown in FIG. 7 a carriage L-plate 64, which comprises a vertical portion 66 and a horizontal portion 74 separated by a bend 72, is used to attach the worksurface 20 to the carriage 78 via a plurality of carriage mounting blocks 82a-82d. The carriage mounting blocks 82a-82d of the carriage 78 extend through a pair of slots 56a,56b located in the column front shroud 54. The horizontal portion 74 of the carriage L-plate 64 is located below the worksurface 20 and a worksurface plate 26 (see FIG. 7) is located atop the worksurface 20, and a plurality of fasteners 28a-28d are routed through the worksurface plate 26, worksurface 20, and into the horizontal portion 74 of the carriage L-plate 64 to thereby clamp the worksurface 20 between the worksurface plate 26 and the horizontal portion 74 of the carriage L-plate 64. A plurality of carriage mounting holes 68a-68d are located in the vertical portion 66 of the carriage L-plate 64, and each of a plurality of fasteners 70a-70d is routed through a respective one of the plurality of carriage mounting holes 68a-68d and into a respective one of the carriage mounting blocks 82a-82d of the carriage 78 to fixedly attach the carriage L-plate 64 and worksurface 20 to the carriage 78.

In this embodiment, an accessory tray 30 is located atop the worksurface plate 26. The accessory tray 30 has a partially-textured bottom surface and can be used to hold electronic devices, e.g., a smartphone or tablet, and/or personal items, e.g., a wallet or keys, in a convenient, easy-to-reach location. It should be understood that, for ease of discussion, in FIG. 7 the worksurface 20 and accessory tray 30 are omitted from view. In this embodiment, the accessory tray 30 has a cutout portion that accommodates placement of a control button panel 32 therein. In this embodiment, the control button panel 32 comprises an up button 33, a down button 34, and a light 35. The up button 33 and down button 34 are input devices that allow the user to electrically control the height position of the height adjustment assembly 40 and create a personal programmed height position, as will be discussed in further detail below. In alternate embodiments, the accessory tray 30 could be omitted entirely and/or the control button panel 32 could be located elsewhere on the workstation 10. In further alternate embodiments, the accessory tray 30 could house additional features, for example one or more USB port(s) and/or Apple Thunderbolt port(s), thus converting the accessory tray 30 into a docking station capable of recharging the attached devices and/or connecting them with the displays 4a,4b.

Referring back to FIG. 3, a perspective rear view of the column 42 with the column back shroud 50 removed to show the interior parts and construction of the column 42 is provided. The column back shroud 50 includes a power plug hole 52 through which a power cord (not shown) would be inserted to power the electric components of the workstation 10. The carriage 78, a printed circuit board ("PCB") 110, a motor 116, a lead screw 94, and a pair of guide tubes 86a,86b located within the column front shroud 54 are also visible in FIG. 3. In principle, and as described in further detail below, the carriage 78 moves upwardly and downwardly within the column 42 along the guide tubes 86a,86b via rotation of the lead screw 94 by the motor 116 in the clockwise or counter-clockwise rotational direction. The guide tubes 86a,86b keep the carriage 78 in a fixed orientation, help to support the mass of the height adjustment assembly 40 and any attached or supported objects, and permit the lead screw 94 to be used to move the carriage 78 upwardly and downwardly by preventing rotation of the carriage 78 so that it is forced to ride along the length of the lead screw 94 as the lead screw 94 is rotated. In this embodiment, the lead screw 94 is a threaded rod having a top end 96 (see FIG. 6) and a bottom end 98 (see FIG. 5).

Figure 4:
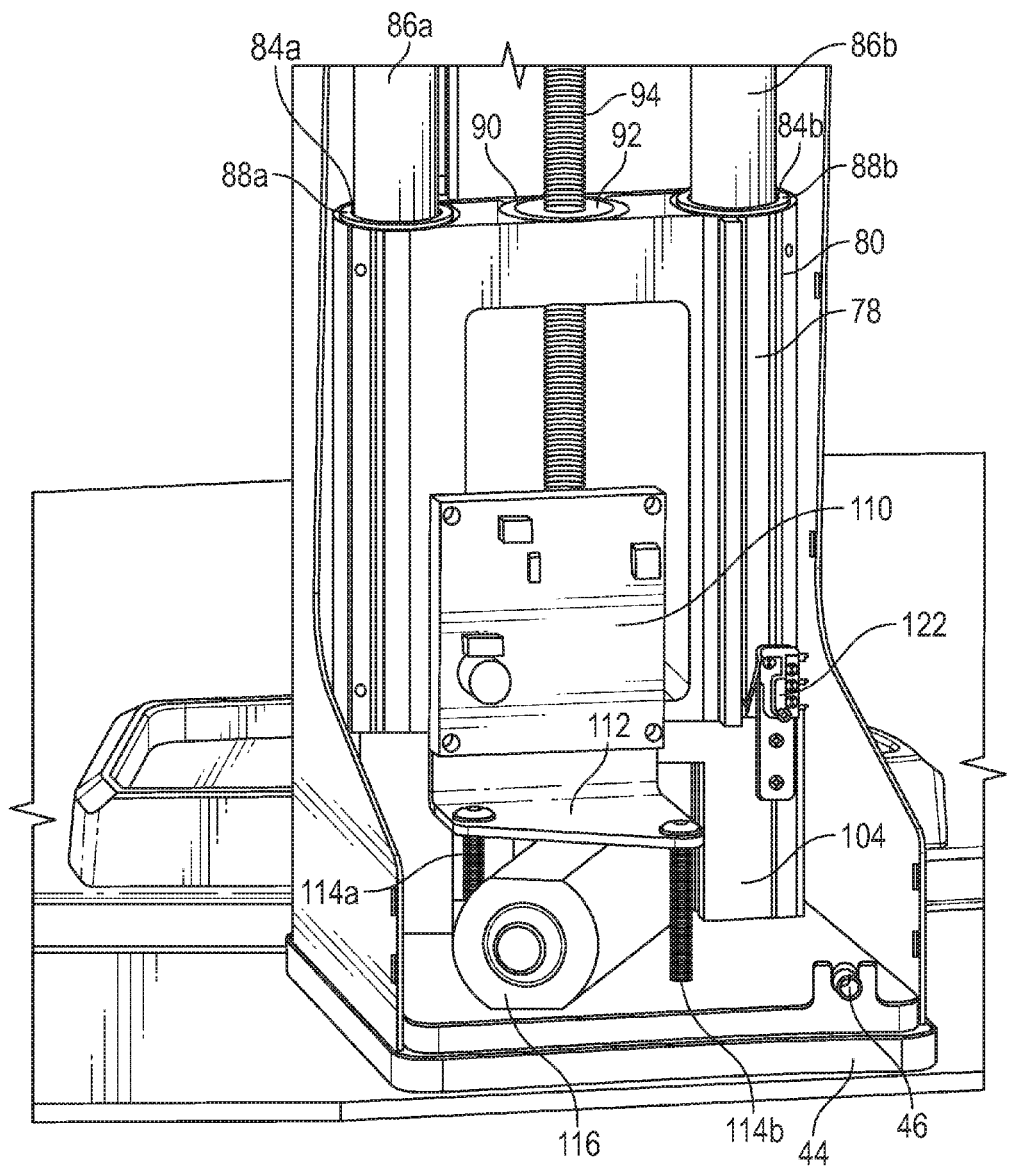
FIG. 4 is a partial rear view of the bottom end of the column of FIG. 3.
Figure 5:
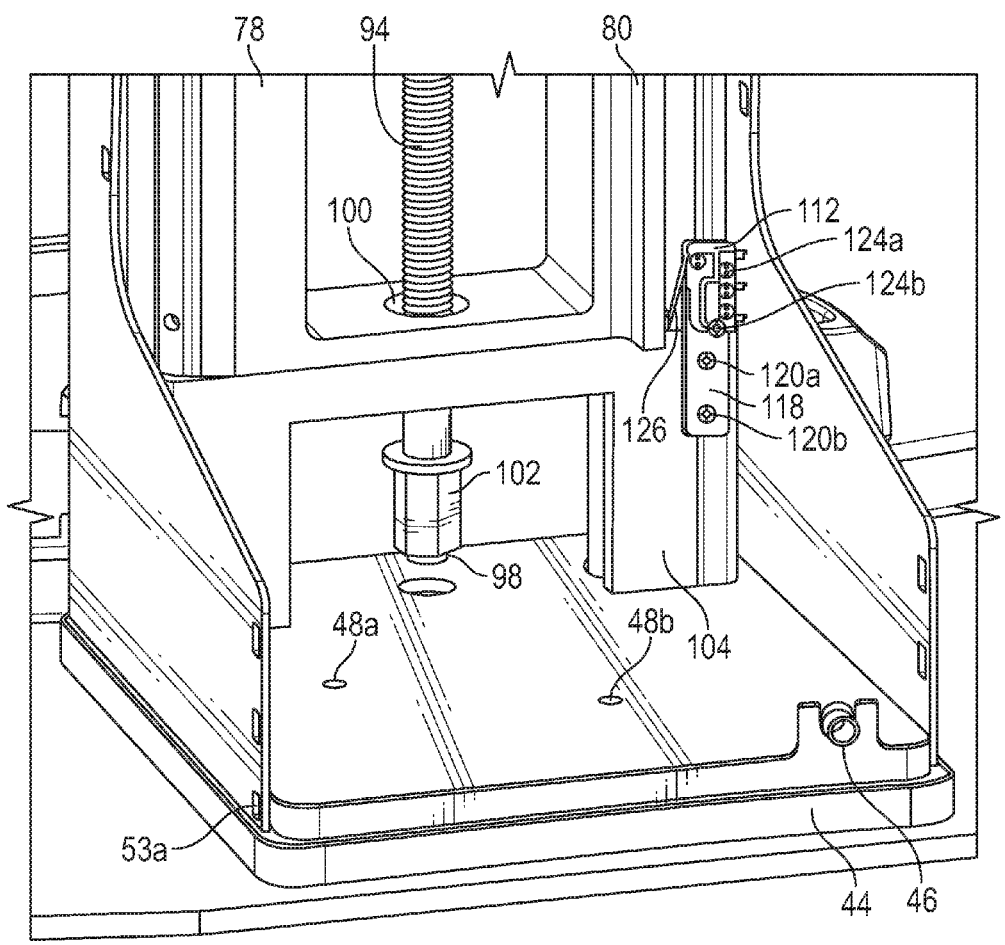
FIG. 5 is a partial rear view thereof, with some parts removed from view.
Figure 6:
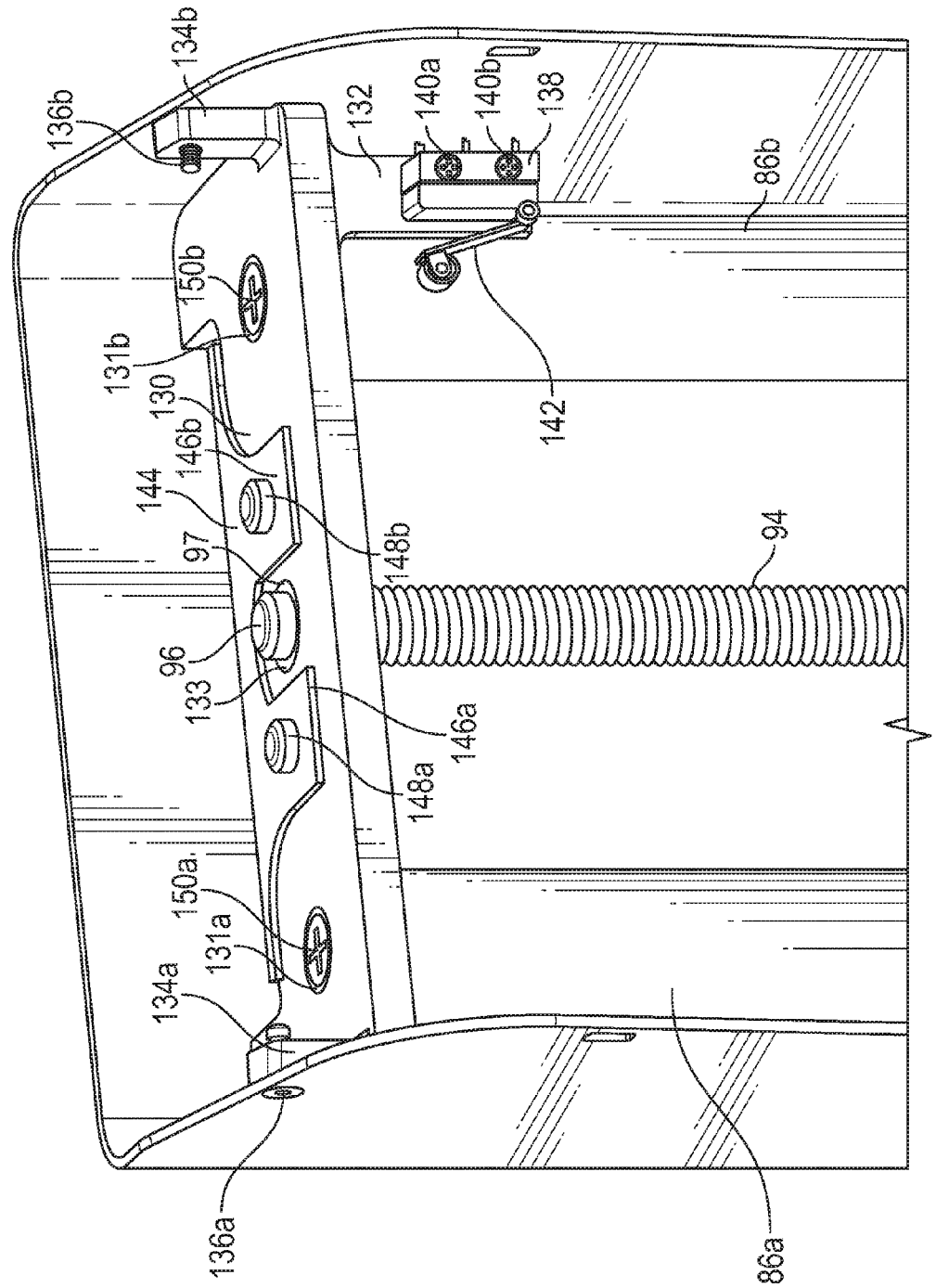
FIG. 6 is a partial rear view of the top end of the column of FIG. 3.

FIG. 4 is a partial rear view of the bottom end of the column 42, FIG. 5 is a partial rear view of the bottom end of the column 42 with some parts removed from view for purposes of discussion, and FIG. 6 is a partial rear view of the top end of the column 42. In this embodiment, the column base plate 44 has a power plug receptacle 46 built therein to accommodate the insertion of a power plug (not shown). As discussed below, power delivered to the workstation 10 via the power plug is used to electrically power movement of the height adjustment assembly 40. The lower end of the column front shroud 54 is attached to the column base plate 44 via a pair of shroud attachment fasteners 53a,53b.

A lead screw support block 104 is fixedly attached to the column base plate 44 via a pair of fasteners (not shown) that are routed upwardly through the bottom of the column base plate 44 into the lead screw support block 104. The lead screw support block 104 has a central hole (not labeled) through which the lead screw 94 extends. The PCB 110 is attached to a PCB mounting bracket 112 via four fasteners (not shown). The PCB mounting bracket 112 is supported from the column base plate 44 via a pair of fasteners 114a,114b that are passed through the PCB mounting bracket 112 and into mounting holes 48a,48b located in the column base plate 44.

The carriage 78 comprises a main body 80 and the carriage mounting blocks 82a-82d discussed above, which are routed through the slots 56a,56b of the column front shroud 54 and attached to the height adjustment assembly 40. The main body 80 of the carriage 78 further comprises a pair of guide tube passages 84a,84b through which the guide tubes 86a,86b are routed. A first pair of sleeves 88a,88b is fitted into the top openings of the guide tube passages 84a,84b and a second pair of sleeves (not shown) is fitted into the bottom openings of the guide tube passages 84a,84b. The sleeves 88a,88b act as bushings to prevent metal-on-metal contact between the guide tubes 86a,86b and the interior surfaces of the guide tube passages 84a,84b of the carriage 78.

The carriage 78 further comprises a lead screw nut hole 90 into which a lead screw nut 92 is inserted. The lead screw nut 92 has internal threading and surrounds the lead screw 94 such that the threading of the lead screw nut 92 mates with the threading of the lead screw 94. Thus, as the lead screw 94 is rotated, the interaction between the lead screw 94 and the lead screw nut 92—which is rigidly attached to the carriage 78—drives the carriage 78 up and down the guide tubes 86a,86b within the column 42. The carriage 78 further comprises a lead screw hole 100 in a lower portion thereof, and the lead screw 94 is routed through this lead screw hole 100. In this embodiment, the lead screw 94 does not contact any portion of the lead screw hole 100. In alternate embodiments, an additional lead screw nut could be located within the lead screw hole 100.

In this embodiment, the motor 116 is a 24V DC motor with a rotating portion that accommodates placement of a hex nut therein. As shown in FIG. 5, a lead screw adapter 102 is fitted to the bottom end 98 of the lead screw 94 and the exterior surfaces of the lead screw adapter 102 engage the rotating portion (not shown) of the motor 116. In alternate embodiments, any suitable motor and lead screw adapter could be used to engage the lead screw 94 and cause its rotation, as would be appreciated by one having ordinary skill in the art.

The lower ends of the guide tubes 86a,86b are fitted with inserts (not shown) having internally-threaded holes, and are fixedly attached to the column base plate 44 via a pair of fasteners (not shown) that are routed up through the underside of the column base plate 44 and into the internally-threaded holes of the inserts that have been placed into the ends of the guide tubes 86a,86b. Similarly, the top ends of the guide tubes 86a,86b are fitted with inserts (not shown) have internally-threaded holes and are fixedly attached to a column top plate 130 (see FIG. 6) that is attached to the top end of the column front shroud 54. The column top plate 130 has a pair of guide rod fastener holes 131a,131b through which guide rod fasteners 150a,150b are routed and secured to the threaded inserts that have been installed into the top ends of the guide tubes 86a,86b. The column top plate 130 further comprises a lead screw holes 133 into which a lead screw bushing 97 has been installed. The top end 96 of the lead screw 94 is installed within the lead screw bushing 97 and held rotatably secure within the lead screw hole 133 and lead screw bushing 97. The column top plate 130 further comprises a pair of shroud attachment tabs 134a,134b, each having a threaded hole therein. Each fastener of a pair of fasteners 136a,136b is routed through a respective side of the column front shroud 54 and into the threaded hole in the respective shroud attachment tab 134a,134b to secure the top end of the column front shroud 54 to the column top plate 130. A gap cover 144 is additionally provided along the internal height of the column 42 between the column front shroud 54 and column back shroud 50. A top end of the gap cover 144 comprises a pair of attachment flanges 146a,146b, and each of the attachment flanges 146a,146b is secured to the column top plate 130 via a respective fastener 148a, 148b. As partially seen in FIG. 8, the gap cover 144 comprises a gap cover slot 145. The gap cover slot 145 permits passage of the wires that are electrically connected between the PCB 110 and the control button panel 32, and provides space for the wires to move as the height of the height adjustment assembly 40 is adjusted. In an alternate embodiment, the gap cover 144 may be sized so that it does not span the entire internal width of the column 42, thereby leaving a space alongside the gap cover 144 for passage of the wires.

A lower limit switch 122 comprising a plunger 126 is fixedly attached to a lower limit switch bracket 118 via a pair of fasteners 124a,124b, and the lower limit switch bracket 118 is fixedly attached to the lead screw support block 104 via a pair of fasteners 120a,120b. As discussed in further detail below, depression of the plunger 126 of the lower limit switch 122 when the carriage 78 moves downwardly into contact with the plunger 126 sends a signal to the PCB 110 that the carriage 78 has reaches its terminal lower position, thereby signaling the motor 116 to no longer rotate the lead screw 94 in the respective rotational direction. Similarly, an upper limit switch 138 comprising a plunger 142 is fixedly attached to an upper limit switch mounting portion 132 of the column top plate 130 via a pair of fasteners 140a,140b. As discussed in further detail below, depression of the plunger 142 of the upper limit switch 138 when the carriage 78 moves upwardly into contact with the plunger 142 sends a signal to the PCB 110 that the carriage 78 has reaches its terminal upper position, thereby signaling the motor 116 to no longer rotate the lead screw 94 in the respective rotational direction.

The PCB 110 is electrically connected to the control button panel 32, which comprises an "up" button 33 and a "down" button 34. Pressing and releasing one of the up button 33 or the down button 34 will sends a signal to the PCB 110 to cause the motor 116 to rotate the lead screw 94 in a respective one of a clockwise or counter-clockwise direction, based on the thread handedness of the lead screw 94, until the height adjustment assembly 40 has reached either the personal programmed position, or one of the terminal positions if no personal programmed position has been set. In this embodiment, only one personal programmed position for the height adjustment assembly 40 is possible. In alternate embodiments, multiple personal programmed positions may be stored in the PCB 110 and selected through multiple preset buttons. In further alternate embodiments, the control button panel 32 may further include a display screen for displaying personal programmed position information and allowing one or multiple pre-set positions for the height adjustment assembly 40.

In this embodiment, the user may go about programming a personal programmed position for the height adjustment assembly 40 by: pressing the down button 34 until the height adjustment assembly 40 has moved to its terminal lower-most position (i.e., its "home" position); moving the height adjustment assembly 40 upwardly by pressing the up button 33 until a desired height has been reached; and then, pressing both the up button 33 and the down button 34 simultaneously while the light 35 is still lit until the light 35 goes out. When the height adjustment assembly is not in this personal programmed position, pressing the up button 33 or down button 34 will move the height adjustment assembly 40 into the personal programmed position if this position is in the direction that was pressed. If the personal programmed position is not in the direction that was pressed, the height adjustment assembly 40 will move to its uppermost or lowermost terminal position, respectively. In an alternate embodiment, when the height adjustment assembly 40 is below the height of the personal programmed position, pressing the up button 33 will move the height adjustment assembly 40 into the personal programmed position; but if the height adjustment assembly 40 is above the height of the personal programmed position, pressing the down button 34 will cause the height adjustment assembly 40 to move all the way down to its home position, rather than stopping at the personal programmed position. In the present embodiment, the user can also erase the personal programmed position setting from memory by: pressing the down button 34 until the height adjustment assembly 40 has moved to its home position; and then pressing and holding the down button 34 for two seconds while the height adjustment assembly 40 is in the home position. It should be understood that, in alternate embodiments according to the present invention, the methods of setting, re-setting, and selecting personal programmed position(s) for the height adjustment assembly could be different.

Turning back to the present embodiment, the PCB 110 is also electrically connected to the lower limit switch 122 and the upper limit switch 138 that detect, respectively, when the carriage 78 has reached its terminal lower and upper positions and signal back to the PCB 110 that the carriage 78 should not be permitted to advance any further in that direction. When the PCB 110 has received such a signal from a respective one of the lower limit switch 122 and upper limit switch 138, the PCB 110 will arrest movement of the rotating portion of the motor 116 in the respective rotational direction.

As would be appreciated by one having ordinary skill in the relevant art, all internal wiring has been omitted from FIGS. 4-6 for ease of illustration. In this embodiment, the PCB 110, control button panel 32, motor 116, lower limit switch 122, upper limit switch 138, and power plug receptacle 46 are all electrically connected together. When the ends of a power plug (not shown) are inserted into the power plug receptacle 46 and a wall outlet, power is provided through the power plug receptacle 46 and its connected wires to the PCB 110, control button panel 32, motor 116, lower limit switch 122, and upper limit switch 138.

Referring again to FIG. 7, a monitor position column 152 having a height 153 is shown. The monitor position column 152 is attached to the carriage 78 via the carriage L-plate 64. The monitor position column 152 comprises a plurality of fastener holes 156a-156c and the vertical portion 66 of the carriage L-plate 64 comprises a plurality of fastener holes 69a-69c. A rear slot 172 of the monitor position column 152 (see FIG. 8) accommodates placement of the vertical portion 66 of the carriage L-plate 64 therein. The monitor position column 152 is fixedly attached to the vertical portion 66 of the carriage L-plate 64 by routing each of a plurality of fasteners 158a-158c through a respective one of the fastener holes 156a-156c and into a respective one of the fastener holes 69a,69c located in the carriage L-plate 64. In this embodiment, the monitor position column 152 is a single-piece of aluminum formed through an extrusion process. In alternate embodiments, the monitor position column 152 could be made of any suitable material, for example any metal or plastic material, and formed through any suitable construction process. In the present embodiment, the top end of the monitor position column 152 is covered by a top cap 154. The top cap 154 provides an aesthetic benefit by covering the top end of the monitor position column 152, and also serves to arrest upward movement of the support beam assemblies 240a,240b along the slots 160a,160b located on the sides of the monitor position column 152, as will be described below in detail.

Figure 8:
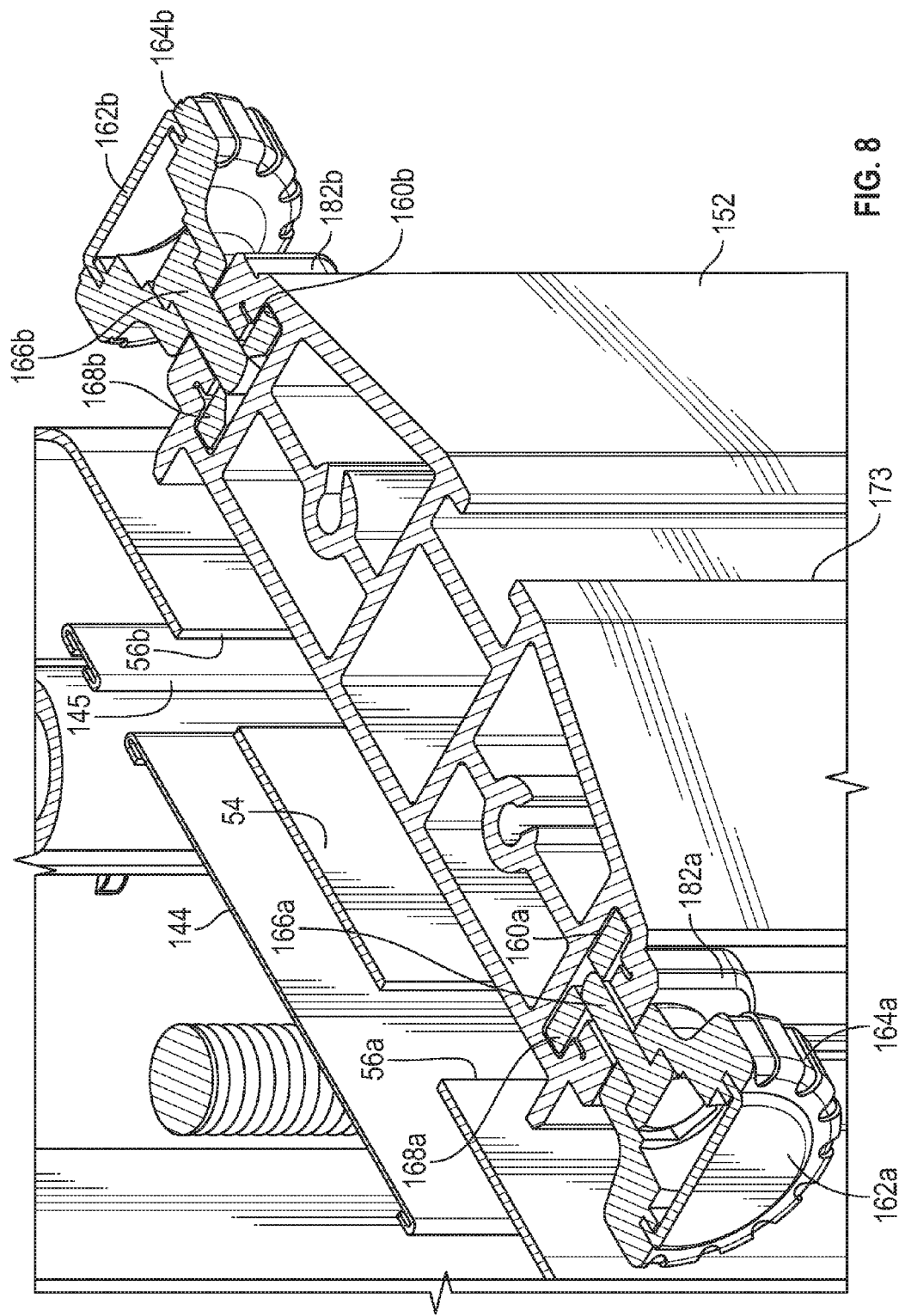
FIG. 8 is a sectional view taken along line 8-8 of FIG. 2, showing the interior of the monitor position column and locking knobs thereof.
Figure 9:
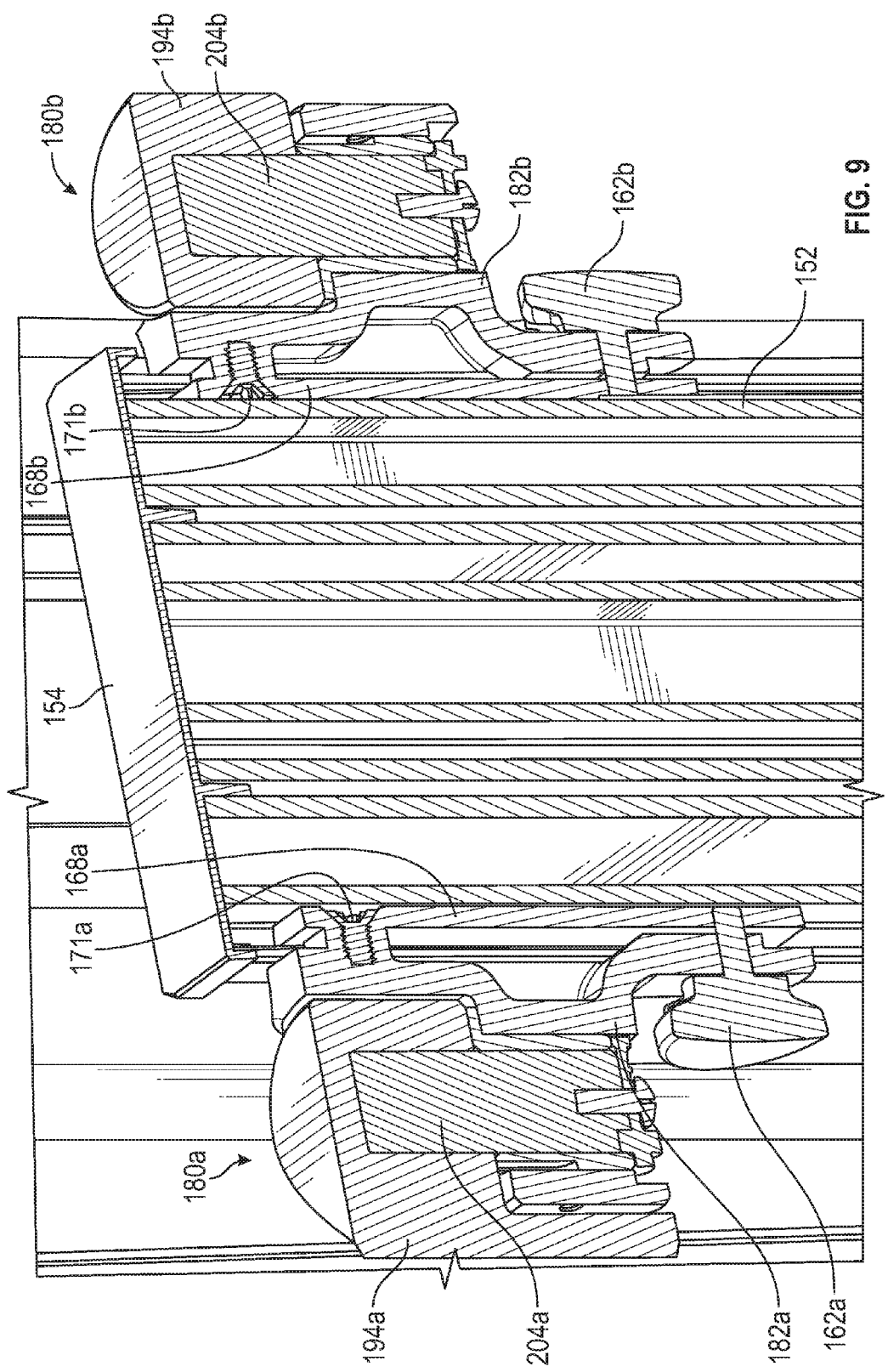
FIG. 9 is a sectional view taken along line 9-9 of FIG. 2, showing the interior of the monitor position column and hinges of the support beam row.

FIG. 8 is a sectional view taken along line 8-8 of FIG. 2, and FIG. 9 is a sectional view taken along line 9-9 of FIG. 2. FIGS. 8 and 9 show details of the monitor position column 152 and hinges 180a,180b of the support beam assemblies 240a,240b that are attached to the monitor position column 152. In this embodiment, each side of the monitor position column 152 has a slot 160a,160b in which a respective hinge 180a,180b of the respective support beam assembly 240a, 240b can move, in order to adjust the height of a respective beam member 242a,242b that is attached to the respective hinge 180a,180b. This permits the heights of the beam members 242a,242b—and accordingly the height of the attached display support assemblies 246a,246b and displays 4a,4b—to be adjusted with respect to the location of the worksurface 20. It is ergonomically desirable to set the height of the beam members 242a,242b at approximately chin level (so that the height of the top line of text appearing on the displays 4a,4b is at approximately eye level), and to set the height of the top surface 22 of the worksurface 20 at approximately elbow level. Since the distance between these body parts varies among individuals, the freedom to adjust this distance allows the workstation 10 to be easily adjusted for ergonomic use by different users. This adds to the overall versatility of the workstation 10. These "elbow-to-eye" distances are labeled in FIG. 2 as distances 38a,38b, and are measured for discussion purposes as between the center of the adapter plate 292 of the respective display support assemblies 246a,246b and the top surface 22 of the worksurface 20, although it should be understood that this measurement is an ergonomic approximation, and that the distances 38a,38b need not be measured in exactly this way.

In this embodiment, the monitor position column 152 further comprises a front slot 173 that is identical in cross-sectional dimension to the slots 160a,160b. If the user desires to add a third display (not shown) to the height adjustment assembly 40, the slide cup of a hinge that is identical to the hinge 180a may be mounted within the front slot 173, and a tilter assembly that is identical to the tilter assembly 280 may be attached directly to the coupling portion of the slide cup. The position of this slide cup and the attached tilter assembly and display along the height of the monitor position column 152 would be adjustable in the same way as described above with respect to the hinges 180a,180b.

Figure 11:
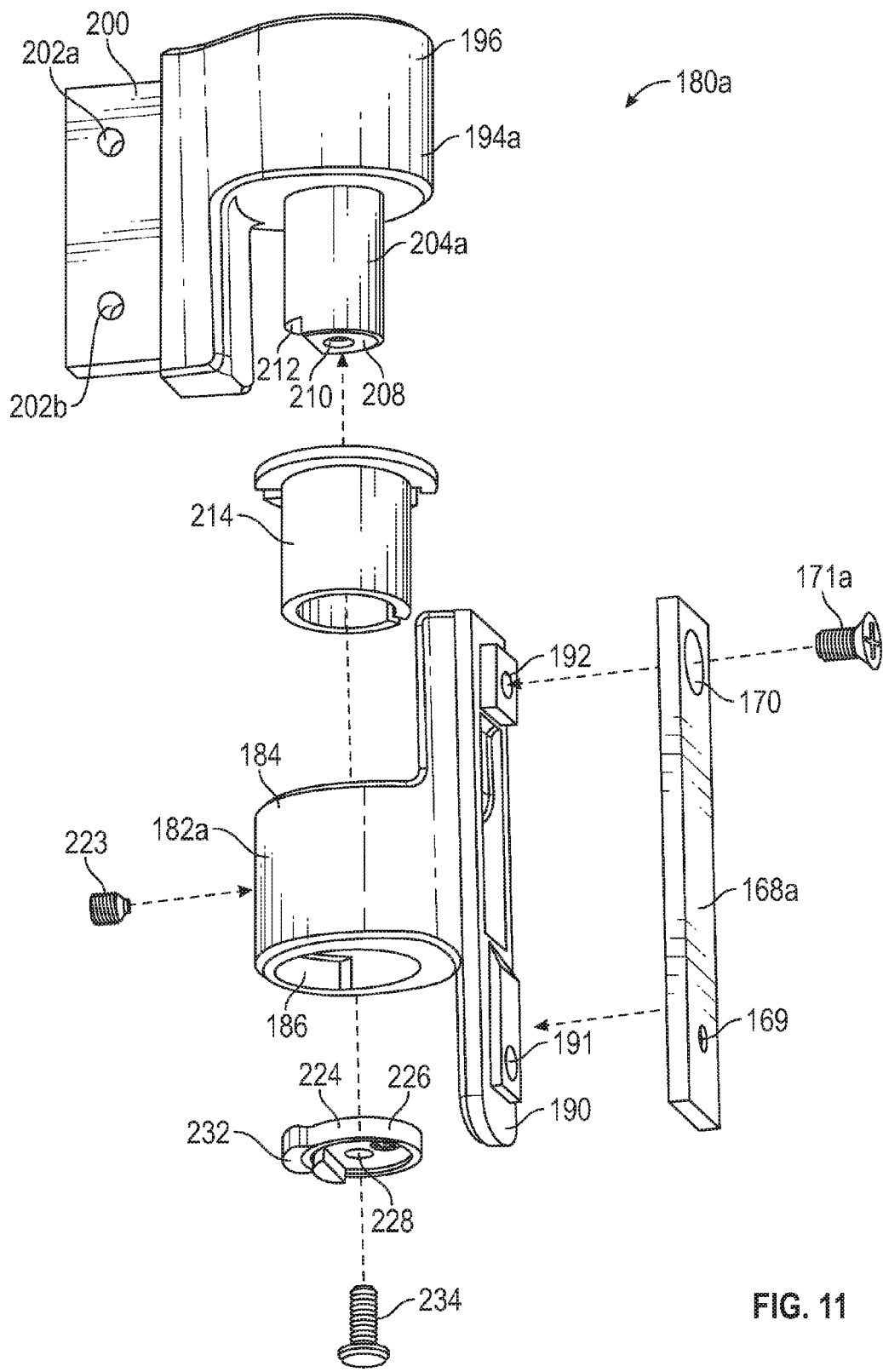

In this embodiment, the support beam assembly 240b is identical to the support beam assembly 240a. Therefore, it should be understood that the discussion below with respect to the support beam assembly 240a—including its components such as the clamping bar 168a, hinge 180a, beam member 242a, and display support assembly 246a—is equally applicable to the support beam assembly 240b. A clamping bar 168a is fitted within the slot 160a and a clamping bar 168b is fitted within the slot 160b. As shown in FIG. 11, the clamping bar 168a has a fastener hole 170 and a locking knob hole 169. A slide cup 182a of the hinge 180a has a threaded hole 192 and a locking knob hole 191 on a sliding portion 190 thereof. A fastener 171a is routed through the fastener hole 170 of the clamping bar 168a to fixedly attach the clamping bar 168a to the slide cup 182a of the hinge 180a, and a fastener 171b is routed through the fastener hole (not labeled) of the clamping bar 168b to fixedly attach the clamping bar 168b to the slide cup 182b of the hinge 180b. A locking knob 162a having a head 164a and a shaft 166a is used to alternately lock and release the position of the clamping bar 168a and attached slide cup 182a of the hinge 180a, to permit the height of the support beam assembly 240a and attached display 4a to be adjusted and fixed within the slot 160a of the monitor position column 152. A locking knob 162b having a head 164b and a shaft 166b is used to alternately lock and release the position of the clamping bar 168b and attached slide cup 182b of the hinge 180b, to permit the height of the support beam assembly 240b and attached display 4b to be adjusted and fixed within the slot 160b of the monitor position column 152.

The shaft 166a of the locking knob 162a is threaded and the locking knob hole 169 of the clamping bar 168a is threaded. Tightening of the shaft 166a of the locking knob 162a with respect to the clamping bar 168a pulls the clamping bar 168a more tightly against the outer surface of the slot 160a, thereby creating sufficient frictional forces between the clamping bar 168a and the slot 160a such that the height position of the hinge 180a is fixed within the slot 160a. When the user wants to adjust the location of the support beam assembly 240a within the slot 160a, the user rotates the locking knob 162a until the friction between the clamping bar 168a and slot 160a is reduced until the position of the support beam assembly 240a within the slot 160a is freely adjustable along the height of the monitor position column 152. When the user has located the support beam assembly 240a in the new desired location within the slot 160a, they would again rotate the locking knob 162a until the clamping bar 168a is firmly pressed against the surface of the slot 160a.

Figure 10:
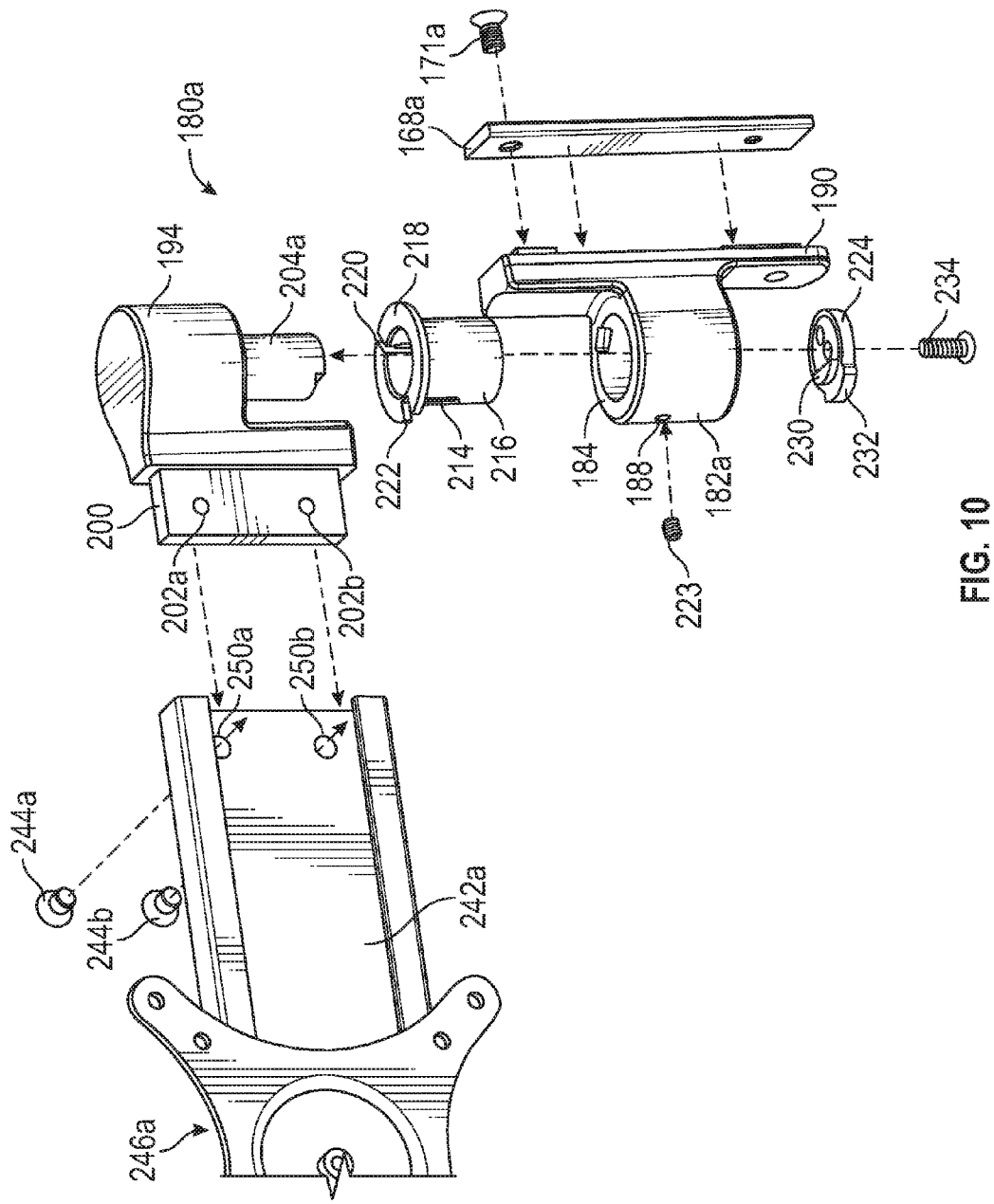
FIGS. 10 and 11 are exploded views of a hinge of the support beam row of the sit-stand workstation of FIG. 1.

Hinges 180a,180b permit the respective attached support beam assemblies 240a,240b to be rotated about generally vertical axes. As seen in FIG. 9, the hinge 180a comprises a hinge cap 194a having a hinge shaft 204a protruding therefrom, and the hinge 180b comprises a hinge cap 194b having a hinge shaft 204b protruding therefrom. Details of the hinge 180a and its connection with a beam member 242a of the support beam assembly 240a are shown in FIGS. 10 and 11. The hinge cap 194a comprises a body portion 196, a beam mounting portion 200 having a pair of fastener holes 202a,202b for attaching the hinge cap 194a to the beam member 242a, and the hinge shaft 204a. A respective one of a pair of fasteners 244a,244b are each passed through a respective one of the fastener holes 250a,250b in the beam member 242a and into a respective one of the fastener holes 202a,202b of the beam mounting portion 200 of the hinge cap 194a.

As noted above, the hinge shaft 204a protrudes from the body portion 196 of the hinge cap 194a. A bottom end 208 of the hinge shaft 204a includes a threaded hole 210 and a notch 212. The bottom end 208 of the hinge shaft 204a is inserted through a bushing 214 and into a coupling portion 184 of the slide cup 182a. The bushing 214 comprises a body portion 216, a lip portion 218, and a lengthwise split 220 through both the body portion 216 and the lip portion 218 that permits the circumference of the bushing 214 to be temporarily reduced to permit insertion of the bushing 214 into the coupling portion 184 of the slide cup 182a. Once installed within the coupling portion 184 of the slide cup 182a, the split 220 creates an inherent spring force that keeps the body portion 216 of the bushing 214 snugly within the coupling portion 184 of the slide cup 182a. In this embodiment, the lip portion 218 of the bushing 214 is larger than the circumference of the opening in the coupling portion 184, and keeps the bushing 214 in place within the coupling portion 184. The lip portion 218 of the bushing 214 prevents metal-on-metal contact between the body portion 196 of the hinge cap 194a and the coupling portion 184 of the slide cup 182a, and the body portion 216 of the bushing 214 prevents metal-on-metal contact between the hinge shaft 204a of the hinge cap 194a and the coupling portion 184 of the slide cup 182a. The bushing 214 also includes a set screw groove 222 running through the lip portion 218 and a portion of the body portion 216 thereof.

As noted above, the slide cup 182a comprises the coupling portion 184 and the sliding portion 190. The sliding portion 190 is affixed to the clamping bar 168a via fastener 171a. The coupling portion 184 further comprises a set screw hole 188. In this embodiment, a set screw 223 is routed through the set screw hole 188 of the coupling portion 184 and into contact with an exterior surface of the bushing 214 within the set screw groove 222. The interaction of the set screw 223 with the set screw groove 222 of the coupling portion 184 prevents the bushing 214 from rotating within the coupling portion 184 of the slide cup 182a. Further, the user can tighten or loosen the set screw 223 against the bushing 214 in order to impart a desired amount of friction to the hinge shaft 204a of the hinge cap 194a. This permits the user to adjust the degree of freedom of rotation of the hinge 180a and the attached support beam assembly 240a.

The bottom end of the coupling portion 184 of the slide cup 182a further comprises a rotation stop slot 186 that is located around a portion of the bottom opening of the coupling portion 184. In this embodiment, the rotation stop slot 186 is located around approximately 135 degrees of the 360 degree circumference of the bottom opening of the coupling portion 184. The hinge 180a further comprises a dog washer 224 comprising a body portion 226, a hole 228, a hinge shaft locking portion 230, and a rotation stop portion 232. The dog washer 224 is affixed to the bottom end 208 of the hinge shaft 204a of the hinge cap 194a via a fastener 234 that is routed through the hole 228 in the dog washer 224 and into the threaded hole 210 located in the bottom end 208 of the hinge shaft 204a. The dog washer 224 and hinge shaft 204a are rotationally fixed together by mating the hinge shaft locking portion 230 with the notch 212 located in the bottom end 208 of the hinge shaft 204a before the fastener 234 is routed through the hole 228 and affixed to the bottom end 208 of the hinge shaft 204a via the threaded hole 210. This arrangement makes the hinge 180a more efficient by ensuring that all components of the hinge 180a rotate together simultaneously.

In this embodiment, the rotation stop portion 232 of the dog washer 224 is located within the rotation stop slot 186 of the bottom end of the coupling portion 184 of the slide cup 182a. The interaction of the rotation stop portion 232 and the rotation stop slot 186 limits the rotational freedom of the hinge 180a and, accordingly, the attached beam member 242a and display support assembly 246a. In this embodiment, the hinge cap 194a of the hinge 180a is free to rotate by approximately 20 degrees to the front relative to parallel with the front face of the column front shroud 54, and by approximately 45 degrees to the rear relative to parallel with the front face of the column front shroud 54. The ability to rotate the hinge 180a by approximately 45 degrees rearwardly allows a user to show the attached display 4a to another person, whereas the inventors have determined that an angle of approximately 20 degrees frontwardly is sufficient for most users' preferences regarding angle monitoring. These angles were also chosen to ensure standing stability of the workstation 10 if longer beam members or heavy displays were added to the workstation 10, including where a third monitor is added to the height adjustment assembly 40 via front slot 173. In alternate embodiments, the rotation stop portion 232 and rotation stop slot 186 could be designed to permit any desired degree of rotational freedom, or the rotation stop portion 232 and rotation stop slot 186 could be omitted entirely such that the hinge 180a has no rotational limitations.

Figure 12:
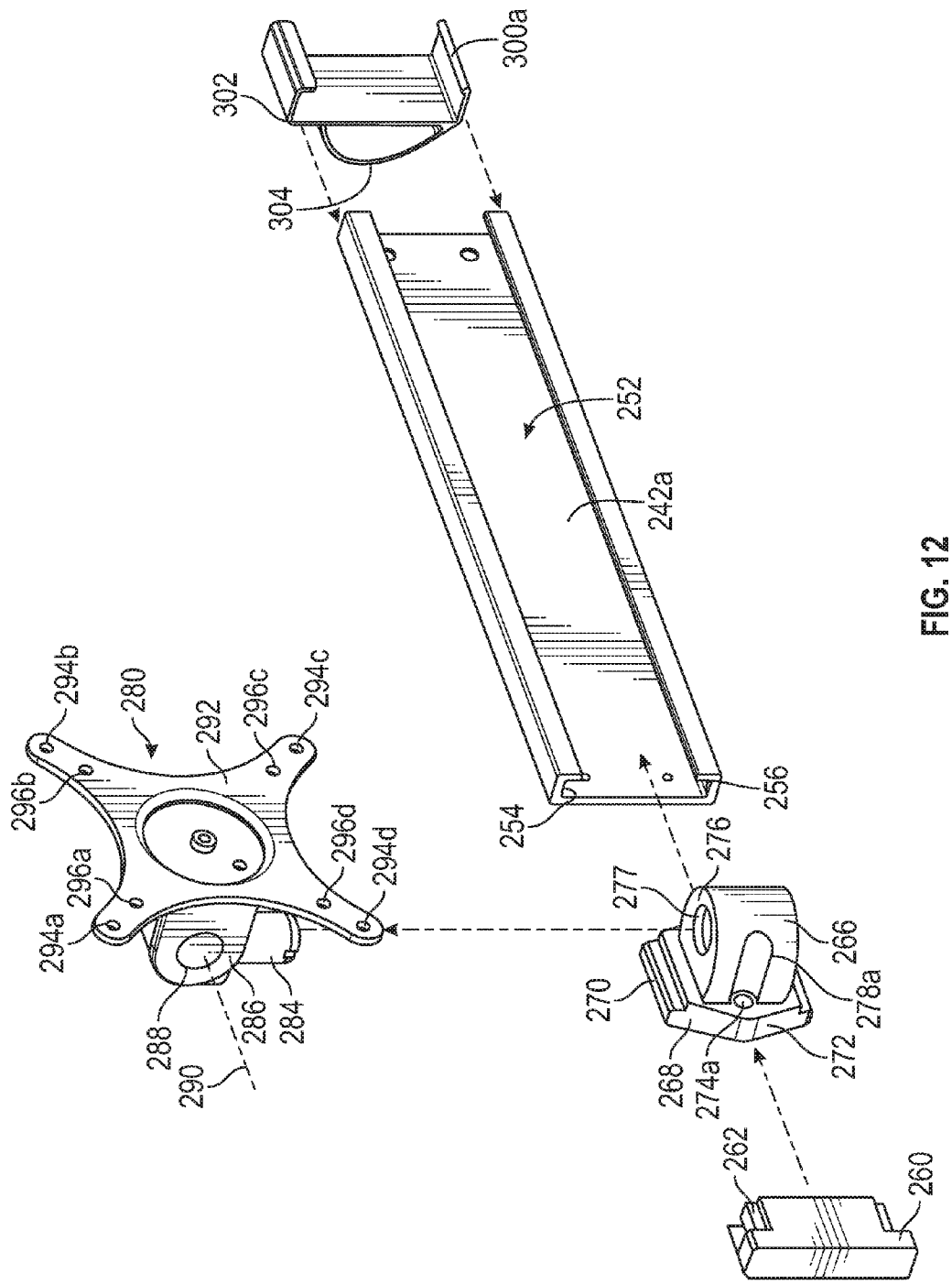
FIGS. 12 and 13 are partial exploded views of a beam member and tilter assembly of the sit-stand workstation of FIG. 1.
Figure 13:
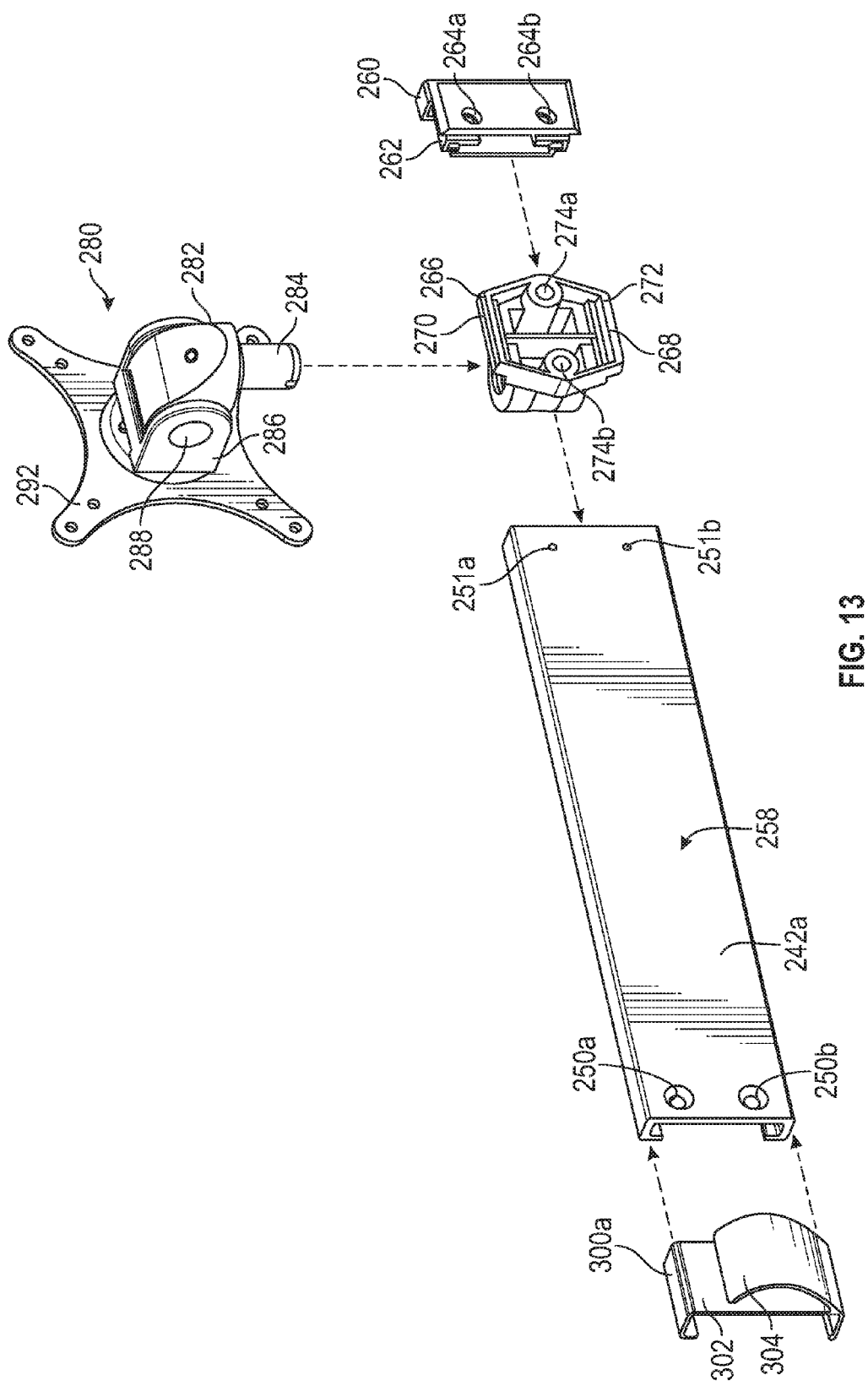

FIGS. 12 and 13 show details of the beam member 242a and the display support assembly 246a, which comprises a tilter slide cup 266 and a tilter assembly 280. The beam member 242a comprises a front side 252 and a rear side 258. The front side 252 of the beam member 242a comprises an upper slot 254 and a lower slot 256 that serve as opposing rails for supporting the tilter slide cup 266 therein, and the rear side 258 does not include any slots. Therefore, in this embodiment, the beam member 242a has a generally "C"-shaped cross-sectional shape. In alternate embodiments, the beam member 242a could be fitted with opposing upper and lower slots on the rear side 258 thereof.

Returning to the present embodiment, the tilter slide cup 266 comprises a beam-engaging portion 268 which includes an upper slot-engaging portion 270 and a lower slot-engaging portion 272, and a tilter shaft-engaging portion 276 which includes a hole 277 that receives a tilter shaft 284 of the tilter assembly 280. The tilter slide cup 266 is installed in the beam member 242a by sliding the beam-engaging portion 268 thereof into one end of the beam member 242a. Once installed within the beam member 242a, the tilter slide cup 266 (and attached tilter assembly 280 and display 4a) is slideable along the length 243a of the beam member 242a to adjust the location of the attached display 4a, as needed or desired by the user. The tilter slide cup 266 further comprises a pair of fastener holes 274a,274b, and each of a pair of corresponding cutouts 278a,278b allows a tool (e.g., a screwdriver) to access the respective fastener hole 274a, 274b. One or more fasteners (not shown) are routable through the fastener holes 274a,274b and into the surface of the front side 252 of the beam member 242a in order to restrict or prevent movement of the tilter slide cup 266 along the length of the beam member 242a.

As noted above, the fastener holes 250a,250b at one end of the beam member 242a are used to attach the beam member 242a to the hinge 180a. A pair of fastener holes 251a,251b at the other end of the beam member 242a are used to fixedly attach a beam cap 260 to that end of the beam member 242a. The beam cap 260 prevents the tilter slide cup 266 from being accidentally removed from the beam member 242a. The beam cap 260 has a slot-engaging portion 262 that fits within the upper slot 254 and lower slot 256 of the beam member 242a, and the slot-engaging portion 262 comprises a pair of fastener holes 264a,264b. Once the slot-engaging portion 262 of the beam cap 260 has been inserted into the end of the beam member 242a, a pair of fasteners (not shown) can be passed through the fastener holes 251a,251b in the beam member 242a and into the fastener holes 264a,264b located in the slot-engaging portion 262 of the beam cap 260, to thereby removably fix the beam cap 260 to the end of the beam member 242a. In some embodiments, the fasteners may be self-tapping screws. In alternate embodiments, the fasteners may be threaded bolts and the fastener holes 264a,264b may have internal threading that fixedly engages the threading of the fasteners.

A cable router 300a is also shown in FIGS. 12 and 13. In this embodiment, the cable router 300 comprises a beam-mounting portion 302 that clips around the exterior profile of the beam member 242a and a cable-supporting portion 304 into which one or more device cables could be placed. Placing of device cables running from the display 4a into the cable-supporting portion 304 of the cable router 300 keeps the cables organized, prevents them from being damaged during use of the workstation 10 (including during adjustment thereof), and enhances the aesthetic appearance of the workstation 10. In the present embodiment, the cable router 300 can be clipped around and removed from the beam member 242a without any disassembly of the support beam assembly 240a. In alternate embodiments, the cable router could attach within the upper slot 254 and/or lower slot 256 of the beam member 242a and/or require partial disassembly of the support beam assembly 240a for installation or removal.

The tilter assembly 280 comprises a tilter body 282 having the tilter shaft 284 that extends downwardly from the tilter body 282 and that permits rotation of the tilter assembly 280 (and the attached display 4a) within the hole 277 of the tilter shaft-engaging portion 276 of the tilter slide cup 266 about a generally vertical axis. The tilter assembly 280 further comprises a center tilt mount 286 that is approximately "U"-shaped in cross section and that is rotatably attached to the tilter body 282 about an axis of rotation 290 via a friction cylinder 288. The friction cylinder 288 has a knurled end portion (not shown) that fixes the friction cylinder 288 with the center tilt mount 286 so that the center tilt mount 286 and friction cylinder 288 rotate together about the axis of rotation 290.

An adapter plate 292 is fixedly attached to the center tilt mount 286. In this embodiment, the adapter plate 292 comprises a first set of four display mounting holes 294a-294d and a second set of four display mounting holes 296a-296d, which are arranged according to, respectively, VESA-compliant 75mm and 100mm square hole patterns. In alternate embodiments, the adapter plate 292 need not include both sets of mounting holes, could include additional sets of mounting holes, or could include mounting holes according to some other hole pattern. In order to attach the display 4a to the adapter plate 292, the display 4a is placed adjacent to the front side of the adapter plate 292 and a plurality of display fasteners (not shown) are routed through either the first set of display mounting holes 294a-294d or the second set of display mounting holes 296a-296d, as appropriate, and into the threaded holes in the rear side of the display 4a.

Figure 14:
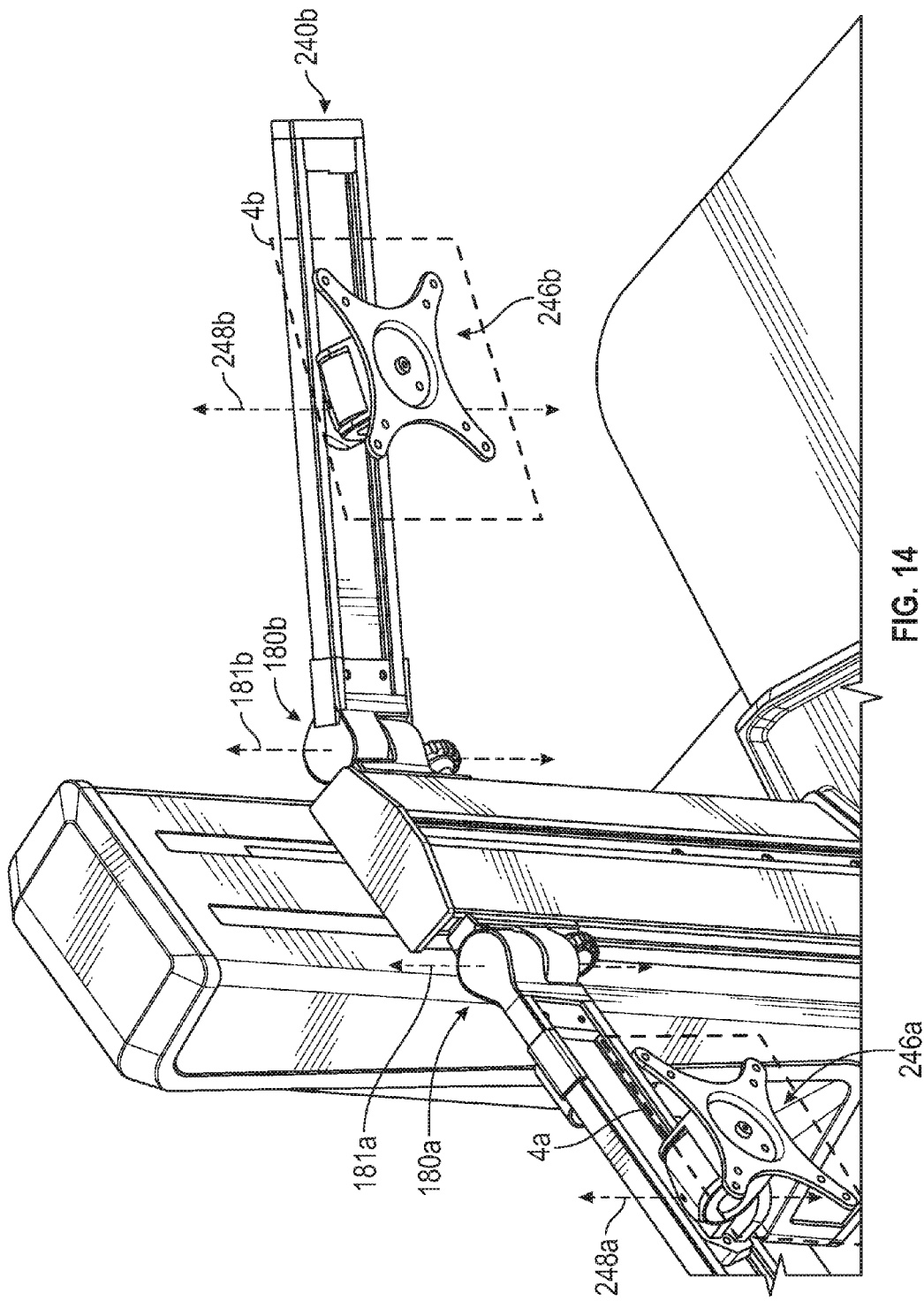
FIG. 14 is a partial view of the focal point adjustment feature of the sit-stand workstation of FIG. 1.

FIG. 14 illustrates the focal point adjustment feature of the workstation 10 of the present invention. This feature comprises independent rotation of the support beam assemblies 240a,240b via the hinges 180a,180b and of the display support assemblies 246a,246b (and attached displays 4a,4b) via the interaction of the tilter assemblies and tilter slide cups (see tilter assembly 280 and tilter slide cup 266 in FIGS. 12 and 13). More specifically, the hinge 180a has a generally vertical axis 181a and the hinge 180b has a generally vertical axis 181b about which the hinges 180a, 180b—and attached support beam assemblies 240a,240b and displays 4a,4b—are rotatable, and the display support assemblies 246a,246b have respective general vertical axes 248a,248b about which the respective tilter assemblies (e.g., tilter assembly 280) and the attached displays 4a,4b are rotatable with respect to the support beam assemblies 240a, 240b. In this way, the user may change the spatial locations of the attached displays 4a,4b by rotating the support beam assemblies 240a,240b about the hinges 180a,180b, and then alter the angle at which the displays 4a,4b face the user by rotating the tilter assemblies (e.g., tilter assembly 280) and attached displays 4a,4b. Further ability to adjust the spatial locations of the displays 4a,4b is provided by the ability of the tilter slide cups (e.g., tilter slide cup 266) to slide along the lengths 243a,243b of the respective beam members 242a,242b, as described in detail above. In this way, the electric sit-stand workstation 10 according to the present invention gives the user complete control to customize the spatial and angular relationship of the displays 4a,4b that have been attached thereto.

Although exemplary implementations of the herein described systems and methods have been described in detail above, those skilled in the art will readily appreciate that many additional modifications are possible in the exemplary embodiments without materially departing from the novel teachings and advantages of the herein described systems and methods. Accordingly, these and all such modifications are intended to be included within the scope of the herein described systems and methods. The herein described systems and methods may be better defined by the following exemplary claims.

What is claimed is:

1. A support apparatus that is supported by and extends from a support surface, the support apparatus comprising:
   a base plate that is adapted to rest on the support surface;
   a column that is fixed to the base plate and that extends upwardly from the base plate and support surface, the column having a height; and
   a height adjustment assembly that is height-adjustable along at least a portion of the height of the column with respect to the support surface, the height adjustment assembly comprising
   a monitor position column having a height,
   a first support beam assembly attached to the monitor position column via a first hinge, the first support beam assembly comprising a first beam member and at least one display support assembly that is attached to the first beam member, the at least one display support assembly being adapted to support a first electronic display therefrom, the first hinge being rotatable about a first generally vertical axis such that a rotational position of the first beam member is adjustable with respect to the monitor position column, the at least one display support assembly being rotatable about a second generally vertical axis with respect to the first beam member; and
   a worksurface attached to the monitor position column, the worksurface having a top surface that extends outwardly in a generally horizontal plane from the monitor position column.

2. The support apparatus of claim 1, wherein a height position of the first support beam assembly is adjustable along at least a portion of the height of the monitor position column.

3. The support apparatus of claim 1, wherein the height adjustment assembly further comprises a second support beam assembly attached to the monitor position column via a second hinge, the second support beam assembly comprising a second beam member and at least one additional display support assembly that is attached to the second beam member, the at least one additional display support assembly being adapted to support a second electronic display therefrom, the second hinge being rotatable about a third generally vertical axis such that a rotational position of the second beam member is adjustable with respect to the monitor position column, the at least one additional display support assembly being rotatable about a fourth generally vertical axis with respect to the second beam member.

4. The support apparatus of claim 3, wherein a height position of the first support beam assembly is adjustable along at least a portion of the height of the monitor position column and a height position of the second support beam assembly is adjustable along at least a portion of the height of the monitor position column.

5. The support apparatus of claim 3, wherein the first hinge is adapted to permit the first beam member to be rotated no more than approximately 45 degrees rearwardly with respect to a front face of the column and no more than approximately 20 degrees frontwardly with respect to the front face of the column, and the second hinge is adapted to permit the second beam member to be rotated no more than approximately 45 degrees rearwardly with respect to the front face of the column and no more than approximately 20 degrees frontwardly with respect to the front face of the column.

6. The support apparatus of claim 1, wherein the first generally vertical axis and the second generally vertical axis are parallel.

7. The support apparatus of claim 1, the first beam member having a length, wherein a translational position of the at least one display support assembly is adjustable along at least a portion of the length of the first beam member.

8. The support apparatus of claim 1, wherein the column extends upwardly from the base plate at an orthogonal angle.

9. The support apparatus of claim 1, the height adjustment assembly being electrically height-adjustable along the at least a portion of the height of the column.

10. The support apparatus of claim 9, further comprising a printed circuit board, wherein a desired position of the height adjustment assembly with respect to the at least a portion of the height of the column may be programmed into the printed circuit board.

11. The support apparatus of claim 1, the monitor position column further comprising at least one slot located on a front side of the monitor position column, the front side opposing a rear side of the monitor position column, the rear side of the monitor position column being attached to the column, wherein at least one additional display support assembly is attachable to the at least one slot such that a position of the at least one additional display support assembly may be adjusted along at least a portion of the height of the monitor position column.

12. A support apparatus that is supported by and extends from a support surface, the support apparatus comprising:
   a base plate that is adapted to rest on the support surface;
   a column that is fixed to the base plate and that extends upwardly from the base plate and support surface, the column having a height and at least one slot oriented along at least a portion of the height of the column, the column further comprising a carriage at least partially located therein;
   a motor that is operably connected to the carriage;
   at least one input device that is operably connected to the motor, the at least one input device being adapted to permit a user to operate the motor such that a position of the carriage along the at least a portion of the height of the column is adjustable; and
   a height adjustment assembly that is attached to the carriage through the at least one slot, such that adjustment of the position of the carriage along the at least a portion of the height of the column adjusts the position of the height adjustment assembly with respect to the support surface accordingly, the height adjustment assembly comprising a first support beam assembly including a first beam member and at least one display support assembly that is attached to the first beam member, the at least one display support assembly being adapted to support a first electronic display therefrom.

13. The support apparatus of claim 12, further comprising a worksurface attached to the height adjustment assembly, the worksurface having a top surface that extends outwardly in a generally horizontal plane from the height adjustment assembly.

14. The support apparatus of claim 13, the height adjustment assembly further comprising a monitor position column, the first support beam assembly being attached to the monitor position column via a first hinge, the first hinge being rotatable about a first generally vertical axis such that a rotational position of the first beam member is adjustable with respect to the monitor position column, the at least one display support assembly being rotatable about a second generally vertical axis with respect to the first beam member.

15. The support apparatus of claim 14, the monitor position column having a height, wherein a height position of the first support beam assembly is adjustable along at least a portion of the height of the monitor position column.

16. The support apparatus of claim 12, the height adjustment assembly further comprising a monitor position column, the first support beam assembly being attached to the monitor position column via a first hinge, the first hinge being rotatable about a first generally vertical axis such that a rotational position of the first beam member is adjustable with respect to the monitor position column, the at least one display support assembly being rotatable about a second generally vertical axis with respect to the first beam member.

17. The support apparatus of claim 16, the monitor position column having a height, wherein a height position of the first support beam assembly is adjustable along at least a portion of the height of the monitor position column.

18. A method of configuring a support apparatus for supporting at least one electronic display, the method comprising:

placing a base plate of the support apparatus on a support surface such that a column that is fixed to the base plate extends upwardly from the base plate and support surface, the column having a height, the support apparatus further comprising a height adjustment assembly that is height-adjustable along at least a portion of the height of the column with respect to the support surface, the height adjustment assembly comprising a monitor position column having a height, a first support beam assembly attached to the monitor position column via a first hinge, the first support beam assembly comprising a first beam member and at least one display support assembly that is attached to the first beam member, the first hinge being rotatable about a first generally vertical axis such that a rotational position of the first beam member is adjustable with respect to the monitor position column, the at least one display support assembly being rotatable about a second generally vertical axis with respect to the first beam member; and a worksurface attached to the monitor position column, the worksurface having a top surface that extends outwardly in a generally horizontal plane from the monitor position column;

attaching the at least one electronic display to the at least one display support assembly; and rotating the first beam member about the first generally vertical axis and rotating the at least one display support assembling about the second generally vertical axis until the at least one electronic display is in a desired spatial and angular position for a user of the support apparatus.

19. The method of claim 18, further comprising the step of adjusting a spatial position of the at least one electronic display along a length of the first beam member.

20. The method of claim 18, further comprising the step of adjusting a height position of the height adjustment assembly along the at least a portion of the height of the column with respect to the support surface.

* * * * *